Figure 2:
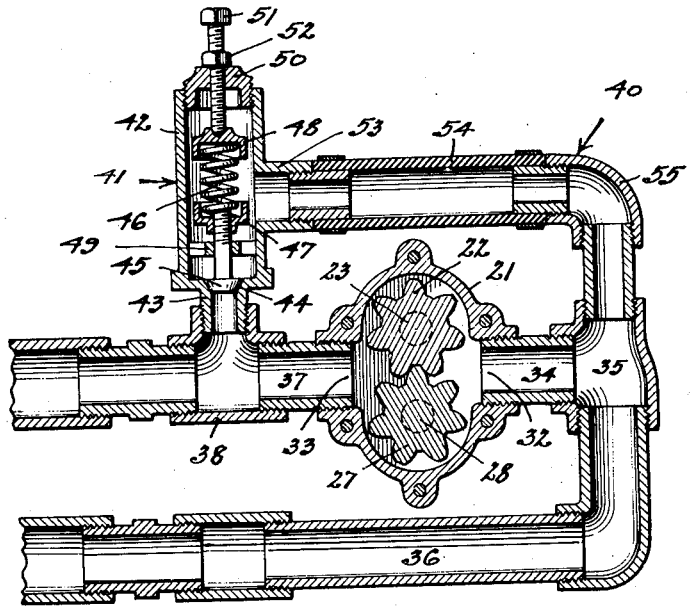

Aug. 29, 1933.　　　J. A. SMITH　　　1,924,466
PUMPING MECHANISM
Filed March 14, 1932　　　2 Sheets-Sheet 1
Fig. 1.
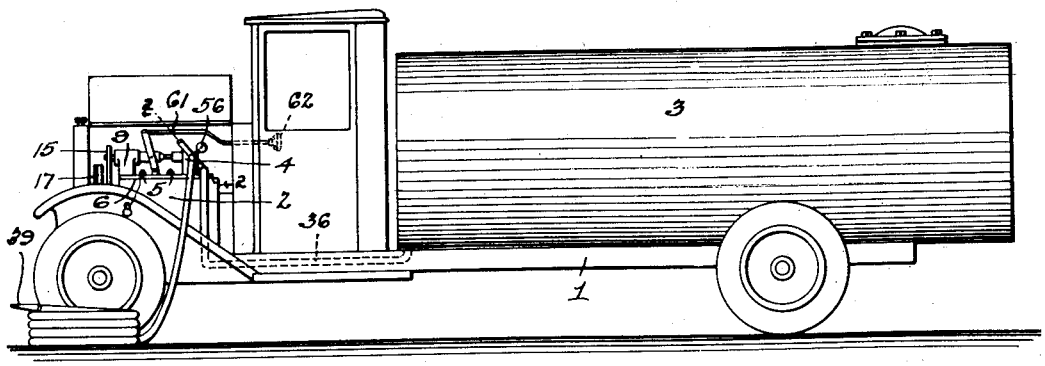
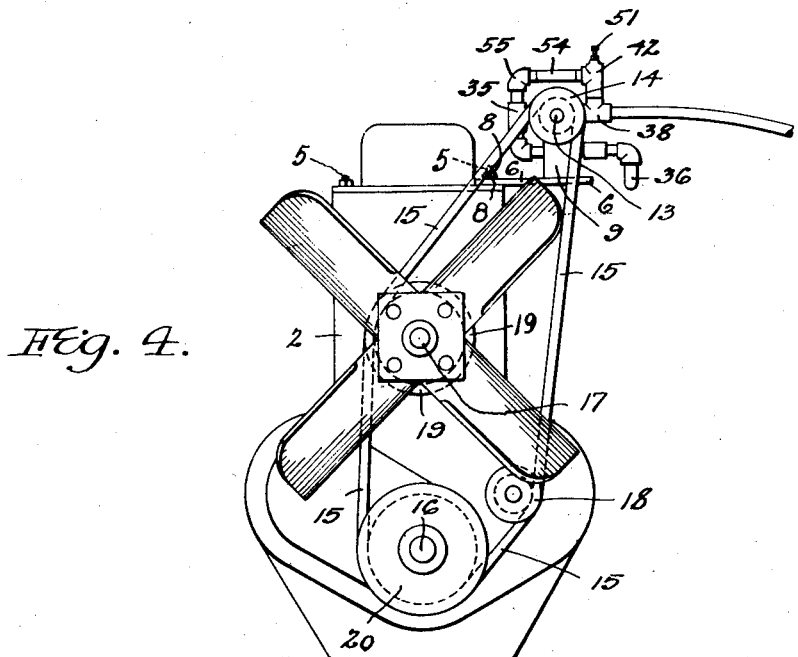
Fig. 4.
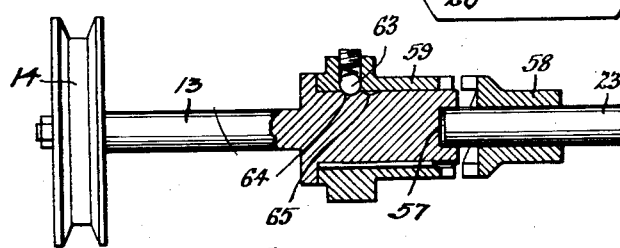
Fig. 5.
Inventor
J. A. SMITH
By Joseph Charles Haller
Attorney Aug. 29, 1933.  J. A. SMITH  1,924,466
PUMPING MECHANISM
Filed March 14, 1932   2 Sheets-Sheet 2

Inventor
J. A. SMITH

Attorney

Patented Aug. 29, 1933

1,924,466

UNITED STATES PATENT OFFICE 1,924,466

PUMPING MECHANISM

James A. Smith, Panama City, Fla.

Application March 14, 1932. Serial No. 598,844

4 Claims. (Cl. 180—53)

This invention relates to pumping mechanism, and more particularly to such mechanism in the form of an attachment for motor propelled vehicles.

It has been recognized in the past that a pump attachment adapted to be operated from the power plant of a motor propelled vehicle would be highly desirable particularly in connection with the pumping of liquids. Such an attachment will permit the utilization of the motor vehicle for pumping water so that it might be used for extinguishing fires and for other uses such as the spraying of insecticides or fungicides from a tank carried by the vehicle.

Many attempts have been made to produce a successful and efficient pumping attachment for motor vehicles and, so far as I am aware, these have usually been attached to the front of the vehicle forward of its radiator and they have been so mounted that they were connected to the main crank shaft of the motor on the portion normally provided for the detachable connection of a cranking lever. Such type of pumping attachment is objectionable in appearance and it has been found that it is costly to construct because of the peculiar construction and adaptation required. The mechanism was found to be objectionable additionally because of its being positioned in such manner with respect to the motor vehicle that it was unprotected from hazard.

Attempts have also been made to overcome the difficulties referred to by attaching the pumping mechanism to a driving wheel of the vehicle; but such a construction is still unsightly and objectionable in other respects.

It is an object of the present invention to overcome the above mentioned difficulties and to provide an efficient pumping attachment for the power plant of a motor vehicle of such construction that it is shielded from view and protected from damage from exterior causes.

Another object of the present invention is the provision of a mechanism having the characteristics set forth and which is adapted to be brought into operation or rendered ineffective by a lever mounted on the dashboard of a vehicle.

The invention contemplates the formation of a pumping attachment which is compact and inexpensive to construct and which may be readily mounted for operation by the power plant of a motor vehicle with substantially no modification of the power plant itself.

It is another object of the present invention to provide a pumping attachment for power plants which is of compact construction and which is adapted to effect an extremely high pressure discharge while being capable of being driven through the medium of the usual type V-shaped drive belt.

It is a further object of the present invention to provide a pumping mechanism which is adapted to be utilized for effecting a discharge through a flexible hose or which may be caused to operate to circulate the liquid through a by-pass, merely by the closing of the hose outlet valve and without altering the operating speed of the mechanism. It is contemplated that the by-pass be rendered ineffective and that a high pressure discharge be had through the outlet upon the opening of the discharge valve.

It is also contemplated by the present invention that a pumping attachment be provided directly upon the motor of a motor vehicle, and that it be adapted to be brought into operation through the medium of a lever mounted on the dash thereof, and that the vehicle be provided with a tank for the liquid to be pumped, which tank will be maintained in communication with the suction side of the pump.

Figure 3:
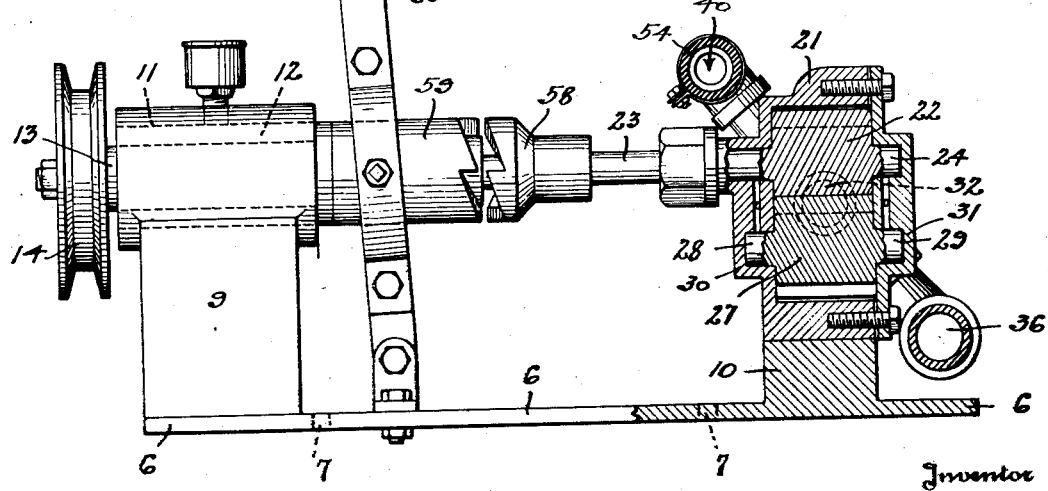

Other objects and advantages will be apparent from the following detailed construction when considered in connection with the accompanying drawings wherein, Fig. 1 is a view of the attachment mounted upon a motor of a motor truck having a tank thereon from which liquid is to be pumped, Fig. 2 is a sectional view taken on line 2—2 of Fig. 1 illustrating the pipe lines and the pump construction, Fig. 3 is a detailed view of the mechanism with the pump being shown in section, Fig. 4 is a front elevation of a vehicle power plant with the pumping attachment in position, and Fig. 5 is a modified form of clutch operating mechanism.

Now referring to the drawings in detail the numeral 1 designates a motor truck adapted to be propelled through the medium of the usual mechanism by means of a power plant 2. The truck is provided with a tank 3 adapted to contain a liquid to be sprayed or otherwise discharged upon the operation of a pumping attachment indicated generally at 4.

The power plant or motor 2 is provided with the usual bolts 5 and the base 6 of the attachment 4 is provided with apertures 7, which are fittted over the bolts 5 and the base is securely clamped upon the motor by means of the nuts 8 which are screw-threaded upon said bolts.

Base 6 may be in the form of a casting having upwardly extending portions 9 and 10 adjacent the respective ends thereof, and the upwardly extending portion 9 is provided with a cylindrical portion having a longitudinal bore 11 into which is secured an anti-friction bearing 12.

A shaft 13 extends through the bearing 12 and the front portion thereof has a belt pulley 14 keyed thereto. The belt pulley is preferably in the form adapted for use with a V-type belt 15 but it is to be understood that the type of pulley employed will be varied in accordance with the type of belt used on the motor vehicle to which the present invention is adapted.

The motor 2 has a crank shaft 16 with a fan shaft 17 mounted thereabove. A generator shaft provided with a pulley 18 is arranged in a plane with the pulley 14 and the fan pulley 19 and the driving pulley 20 carried on the crank shaft 16. The mechanism as described upon the rotation of the crank shaft with the pulley 20 will cause the movement of the fan belt 15 and the resultant rotation of pulleys 14, 18 and 19.

The upward extension 10 arranged on the base 6 carries a gear pump 21 which may be of any well known construction although it is preferably provided with an upper gear 22 formed with a shaft 23 and a stub shaft 24. Gear 22 is in mesh with a lower gear 27, which gear 27 is provided with shaft extensions 28 and 29 which are journaled in bearings 30 and 31 arranged in the pump casing and the pump cover respectively. An intake port 32 is provided in the pump casing and the casing is also provided with an outlet port 33. A nipple 34 extends from the inlet port 32 and is connected by a reducing T connection 35 to an inlet pipe 36. The inlet pipe 36 is adapted to be maintained in direct communication with the tank 3 or it may be connected to a flexible hose which is adapted to have its open end inserted into a pool, stream of water, or other source of liquid supply.

A nipple 37 communicates with the outlet port 33 and it is provided with pipe connections 38 to which a flexible hose is adapted to be attached in order that the hose may be extended from the pumping mechanism in the direction of the place for the liquid discharge. The hose is preferably provided with a nozzle 39 and the pump mechanism is so constructed that it may be permitted to operate while the nozzle is closed without rupturing the hose or otherwise damaging the mechanism. A by-pass connection 40 arranged between the pipe connection 38 and the T connection 35 permits of this operation of the pump during the time that the discharge is prevented. A relief valve 41 arranged within the by-pass connection 40 is provided with a casing 42 having a reduced screw-threaded portion 43 threaded into one of the connections 38. A valve seat 44 is provided in the casing 42 and a reciprocating valve 45 is normally maintained in a closed position against the seat 44 by means of a coil spring 46 positioned by caps 47 and 48 respectively. The cap 47 is threaded upon the stem of the valve 45 and the stem is in turn guided in a bearing 49. Casing 42 is provided with a plug 50 screwed therein, the plug carrying an adjusting screw 51 which bears against cap 48 and which is adapted to be locked in the adjusted position by the nut 52. In the side of the casing 42 a connection 53 is provided so that a short hose section 54 may be arranged between the casing 42 and the elbow 55, the elbow being in communication with the T connection 35. A pressure indicator 56 is arranged in said connection 38 at an angle to the casing 42 in order that the pressure at the discharge side of the pump may be noted.

The pump shaft 23 extends into a socket 57 in the shaft 13 as will be clearly seen from the modified form of clutch mechanism shown in Fig. 5 and it has keyed thereto a clutch section 58. On the end of the shaft 13 a clutch section 59 is mounted for longitudinal movement and it is adapted to be brought into engagement with the section 58 whereby rotary movement imparted to the pulley 14 by the fan belt 15 will be transmitted to the gear 22 of the pump and resultingly to the gear 27. In the form shown in Figs. 1 and 3 the clutch section 59 is adapted to be moved into engagement with the section 58 through the medium of a pivoted yoke 60 which yoke has a connecting rod 61 secured thereto so that the yoke will be moved upon reciprocation of the handle 62 arranged in the cab of the truck.

In the form illustrated in Fig. 5 the clutch section 59 is provided with a locking spring pressed ball 63 which is adapted to be seated in one or the other of depressions 64 and 65. In this form of clutch mechanism the operator grasps the section 59 and causes the dislodgment of the ball 63 from the recess 64 and its movement into the recess 65 whereupon the sections 58 and 59 of the clutch are maintained in locked position.

In operating the mechanism as described, the truck is propelled to the place of use and the clutch section 59 is caused to be engaged with section 58 either by the handle illustrated in Fig. 1 or by the manner of operation of the clutch shown in Fig. 5 depending upon the construction employed. The operation of the motor or power plant 2 has, of course, caused the fan belt 15 to rotate the fan as well as the other pulleys over which the belt is entrained. Therefore, the engagement of the clutch sections causes the rotation of the pump gears 22 and 27 anti-clockwise and clockwise respectively as viewed in Fig. 2 so that the liquid from the tank 3, or from the other source to which the pipe section 36 is connected, is caused to be drawn into the pipe section and through the inlet port 32 whereupon it is carried outwardly along the pump casing walls and within the spaces between the teeth of the pump gears and it is thereafter upon rotation of the gears caused to be ejected from said spaces and to be discharged through the port 33.

As the operator is arranging the discharge hose to get to a point of advantage for the extinguishing of fires, the spraying of trees, or for any other use to which the invention is put, the nozzle 39 is maintained closed to avoid a waste of the liquid. Such operation creates a pressure in the pipe section 38, as can be noted upon the indicator 56, and relief from this pressure is had through the automatic operation of the valve 45 to permit the circulation of the liquid through the valve casing 42, the hose section 54, the elbow 55, back into the T connection 35, and thereafter through the inlet port 32 and again into the pump chamber.

When the operator has reached the point of advantage the nozzle 39 is opened whereupon the spring 46 will cause a closing of the valve 45 whereby the mechanism will thereafter operate in the normal manner unless the nozzle 39 is again closed. The adjusting screw 51 may be moved to increase or decrease the tension upon the spring 46 and after it is adjusted it is locked in position so that it permits the release of a pressure only when a predetermined pressure is reached. It will therefore be seen that pressure to a desired extent may be had at the outlet side of the pump so that a strong stream may be discharged from the nozzle 39. I have found in practice that it is quite often desirable to have a pressure as high as 200 lbs. per square inch and this I have been able to effect without difficulty.

Although the invention has been illustrated specifically in connection with the power plant of a motor vehicle with which it is particularly adapted for use because of the compact arrangement, it is to be understood that the mechanism may be employed in connection with other sources of power particularly when a belt drive is utilized in connection with the power plant.

What I claim is:

1. In a motor and power take-off assembly the combination of a motor having a main shaft extending outwardly therefrom and provided with a belt pulley, of a fan shaft having a belt pulley, a power take-off mechanism comprising a base secured to the upper portion of the motor above the plane of the fan shaft, a shaft journaled in a bearing supported by the base and being provided with a pulley in a plane with the crank shaft pulley and fan shaft pulley, a belt entrained over the respective pulleys whereby the rotation of the crank shaft will directly effect the rotation of said journaled shaft pulley, a rotary pump supported by said base and having a shaft extending therefrom and terminating adjacent said journaled shaft, and a clutch mechanism arranged between the journaled shaft and the pump shaft for connecting and disconnecting the same at will.

2. In a motor and power take-off assembly the combination of a motor having a main shaft extending outwardly therefrom and provided with a belt pulley, of a fan shaft having a belt pulley, a power take-off mechanism comprising a base secured to the upper portion of the motor above the plane of the fan shaft, a shaft journalled in a bearing supported by the base and being provided with a pulley in a plane with the crank shaft pulley and fan shaft pulley, a belt entrained over the respective pulleys whereby the rotation of the crank shaft will directly effect the rotation of said journalled shaft pulley, a rotary pump supported by said base and having a shaft extending therefrom in axial alignment and terminating adjacent said journalled shaft, a movable clutch member mounted on the inner end of said journalled shaft, a fixed clutch member mounted on the outer end of said rotary pump shaft adapted to be engaged by the movable clutch member, and means for effecting the engagement of said clutch members at will.

3. In a motor and power take-off assembly, the combination of a motor having a main shaft extending outwardly therefrom and provided with a belt pulley, of a fan shaft having a belt pulley, a power take-off mechanism comprising a base secured to the upper portion of the motor above the plane of the fan shaft, a third pulley journalled in a bearing supported by the base and disposed in a plane with the crank shaft pulley and the fan shaft pulley, a belt entrained over the respective pulleys whereby the rotation of the crank shaft will directly effect the rotation of said third pulley, a rotary pump supported by said base and having a shaft in alignment with the axis of said third pulley and extending adjacent said third pulley, and a clutch mechanism arranged between the said third pulley and the pump shaft for connecting and disconnecting the same at will.

4. In a motor and power take-off assembly, the combination of a motor having a main shaft extending outwardly therefrom and provided with a belt pulley, a power take-off assembly comprising a base attached to the upper portion of the motor and extending outwardly therefrom, said base having upwardly extending projections adjacent the respective ends thereof, one of said projections supporting a rotary pump, the other of said projections provided with a bearing, a shaft journalled in said bearing and having a pulley mounted thereon in a plane with said crank-shaft pulley and adapted to be driven from the motor, a second shaft extending from said rotary pump in axial alignment with said first mentioned shaft, a clutch mechanism for driving said pump shaft from said journalled shaft, and means for actuating said clutch mechanism.

J. A. SMITH.